H. M. ARTZ & E. B. LORENZEN.
PACKLESS VALVE.
APPLICATION FILED APR. 12, 1913.

1,066,240.

Patented July 1, 1913.

Witnesses

Inventors
HARRY M. ARTZ,
EDWARD B. LORENZEN,

By

Attorney

UNITED STATES PATENT OFFICE.

HARRY M. ARTZ, OF MANSFIELD, AND EDWARD B. LORENZEN, OF SANDUSKY, OHIO.

PACKLESS VALVE.

1,066,240.  Specification of Letters Patent.  Patented July 1, 1913.

Application filed April 12, 1913. Serial No. 760,690.

*To all whom it may concern:*

Be it known that we, HARRY M. ARTZ, a citizen of the United States, and a resident of Mansfield, in the county of Richland and State of Ohio, and EDWARD B. LORENZEN, a citizen of the United States, and a resident of Sandusky, in the county of Erie and State of Ohio, have made certain new and useful Improvements in Packless Valves, of which the following is a specification.

Figure 1:
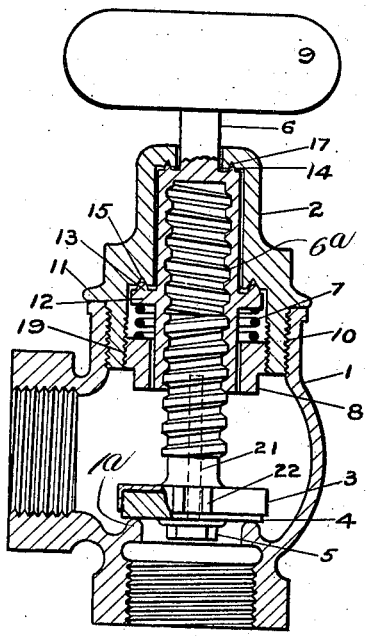
Figure 2:
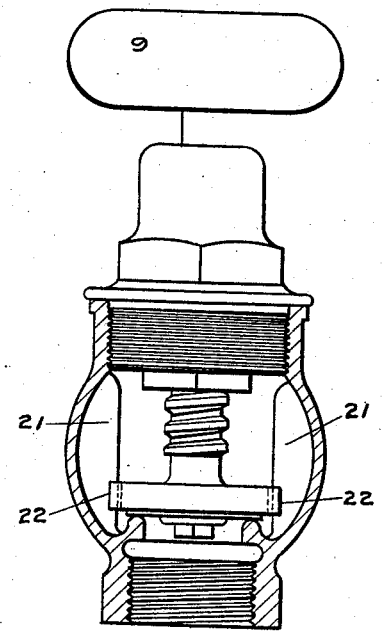
Figure 3:
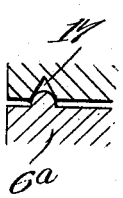

Our present invention relates to valves and the particular object thereof is to provide a valve which may be opened and closed in a manner similar to that of the ordinary valve and which will dispense with the necessity of packing and the gland usually surrounding the valve stem in reciprocating valves. We accomplish this object by the structure as shown in the accompanying drawing, in which, Figure 1 is a vertical section through the valve body, the bonnet and the handle stem. Fig. 2 is a similar view through the valve body, showing the bonnet and valve and valve rod in elevation, and taken substantially at right angles to the section in Fig. 1, and Fig. 3 is a diagrammatic view, taken on an enlarged scale and illustrating the engaging ribs and grooves which coöperate to dispense with the necessity for packing.

Referring now to these figures, 1 indicates the body of our improved valve, which is of the usual construction, having side and base openings, and provided with a valve base openings, and provided with a valve seat 1ª surrounding the upper portion of the base opening. The upper open mouth of the body 1 is threaded to receive the externally and internally threaded lower portion 10 of the bonnet 2 which extends upwardly from the body. This bonnet as will be clearly seen by reference to Fig. 1 has an upper constricted end apertured to receive the reduced upper portion 6 of the handle stem carrying the handle 9 at its upper end, the bonnet having a cylindrical bore in which is disposed the lower enlarged cylindrical portion 6ª of the handle stem, and the bonnet further having a lower enlarged bore in which is disposed an annular flange 12 carried by the portion 6ª of the handle stem.

The inner surface of the portion 6ª of the handle stem is threaded to receive the upper portion of the threaded valve stem 21, at the lower end of which is the valve disk holder 3 in which the valve 4 is held by means of a member 5, this valve 4 being adapted to engage upon the valve seat 1ª and being movable vertically toward and from the same by rotation of the handle 9 in view of the threaded engagement of the handle stem and valve stem, and the fact that the former is prevented from longitudinal movement.

The annular flange 12 is acted upon by means of a spring 7 coiled about the lower portion of the handle stem and compressed between the lower surface of the said flange and an annular nut 8 which surrounds the said handle stem and adjustably engages the inner threads of the lower bonnet portion 10 as indicated at 19.

The constricted upper end of the bonnet 2 forms a shoulder, the inner surface of which is provided with an annular V-shaped groove surrounding its aperture through which the upper stem portion 6 projects, the handle stem being provided with a corresponding shoulder between its portions 6 and 6ª which has an annular rib coöperating with the groove, this rib being indicated at 14 and the groove being indicated at 17. The bonnet 2 also has a shoulder resulting from the enlarged lower bore before mentioned which receives the annular flange 12, this shoulder having an annular V-shaped groove 15 and the flange 12 having an annular rib 13 coöperating with the groove. Thus from the foregoing it will be seen that the annular flange 12 with the coöperation of the spring 10 and the adjustable nut 8 serves to maintain the ribs 13 and 14 in engagement during the rotation of the handle stem for the purpose of raising or lowering the valve from and to its seat, and it will be further seen that this structure eliminates the necessity for packing and the frequent attention and overhauling and renewing of packing incident to the ordinary reciprocating valve, the means employed by us for this purpose being simple and adding little if anything to the cost of the construction of the valve.

We claim:

1. In a packless reciprocating valve, the combination of a body having a valve seat, a threaded valve stem carrying a valve adapted to coöperate with the said seat, a bonnet having connection with the body, a handle stem which is mounted through and rotatable within the bonnet and carries a handle at its upper outer end, the lower portion of said handle stem being cylindrical and internally threaded to receive the valve stem therein, the bonnet being provided with an internal annular shoulder having a groove, and the said handle stem being provided with an annular flange opposing the said bonnet shoulder and provided with an annular rib adapted to enter and coöperate with the said groove, and a nut having a threaded adjustable connection in the lower portion of the bonnet for maintaining the said rib and groove in engagement and to prevent longitudinal movement of the handle stem.

2. In a packless reciprocating valve, the combination of a body having a valve seat, a valve for engagement with the seat and provided with a threaded stem, a bonnet having connection with the body and provided with a cylindrical bore and an upper constricted end forming a shoulder, a handle stem having a lower cylindrical internally threaded portion to receive the threaded valve stem and an upper reduced portion projecting through the constricted upper end of the bonnet and provided with a handle at its upper end, the lower portion of the bonnet having an enlarged bore forming an annular shoulder and provided with threads upon the lower portion of its wall, an annular flange surrounding the handle stem and disposed within the said enlarged bore, an adjustable nut engaging the threads of the wall at the lower portion of the enlarged bore, a spring coiled about the lower portion of the handle stem between its said flange and the said nut, and annular ribs having rounded surfaces, formed upon the said flange of the handle stem and also upon its shoulder adjacent the upper reduced portion thereof, the shoulders formed within the bonnet being provided with annular V-shaped grooves whereby to receive the said annular ribs, all for the purpose described.

HARRY M. ARTZ.
EDWARD B. LORENZEN

Witnesses for Harry M. Artz:
 E. H. LINDSEY,
 M. B. PINKLEY.
Witnesses for Edward B. Lorenzen:
 JAMES M. FRENCH,
 MARGARET NOLAN.